(12) United States Patent
Criniti et al.

(10) Patent No.: US 6,730,845 B1
(45) Date of Patent: May 4, 2004

(54) ELECTRIC COMPONENT BOX WITH REMOVABLE COVER

(75) Inventors: Joseph Criniti, New Britain, CT (US); Javier Ignacio Larranaga, Bristol, CT (US); Vito William Santoro, Coahuila (MX); Michael Gerard Tobin, Mankato, MN (US); Mark Howard Thomson, Mankato, MN (US); Thomas Randolph Campbell, Washington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/573,705

(22) Filed: May 18, 2000

(51) Int. Cl.⁷ .................................................. H02G 3/14
(52) U.S. Cl. ............................. 174/67; 174/66; 174/50; 174/53; 220/3.2; 220/3.8
(58) Field of Search .............................. 174/66, 67, 50, 174/53, 48, 57, 59, 49, 54; 220/3.2, 3.3, 3.4, 3.5, 3.6, 3.7, 3.8, 3.92, 3.94, 241, 242

(56) References Cited

U.S. PATENT DOCUMENTS

| | | | | |
|---|---|---|---|---|
| 3,140,344 A | * | 7/1964 | Slater et al. .................. | 174/67 |
| 3,618,804 A | * | 11/1971 | Krause ........................ | 174/50 |
| 3,895,179 A | * | 7/1975 | Wyatt ......................... | 174/50 |
| 3,955,709 A | * | 5/1976 | Coley et al. .................. | 174/50 |
| 4,199,072 A | * | 4/1980 | Jacks ......................... | 220/3.8 |
| 4,675,782 A | | 6/1987 | Hibbert et al. | |
| 4,851,963 A | * | 7/1989 | Miller et al. ................. | 361/356 |
| 5,045,640 A | * | 9/1991 | Riceman ....................... | 174/67 |
| 5,076,455 A | * | 12/1991 | Begley ........................ | 220/3.8 |
| 5,148,348 A | * | 9/1992 | White ......................... | 174/67 |
| 5,228,584 A | * | 7/1993 | William, Jr. .................. | 220/3.8 |
| 5,272,297 A | | 12/1993 | Reichow et al. | |
| 5,281,779 A | | 1/1994 | Bogovican et al. | |
| 5,317,108 A | * | 5/1994 | Prairie, Jr. ................... | 174/67 |
| 5,362,924 A | * | 11/1994 | Correnti ...................... | 174/67 |
| 5,398,161 A | | 3/1995 | Roy | |
| 5,889,855 A | | 3/1999 | Davis | |
| 5,910,642 A | * | 6/1999 | Daoud ......................... | 174/57 |
| 6,028,268 A | * | 2/2000 | Stark et al. ................... | 174/67 |
| 6,089,392 A | * | 7/2000 | Daoud ......................... | 220/4.02 |
| 6,300,564 B1 | * | 10/2001 | Moraes et al. ................. | 174/52.1 |

* cited by examiner

*Primary Examiner*—Dean Reichard
*Assistant Examiner*—Angel R. Estrada
(74) *Attorney, Agent, or Firm*—Karl A. Vick, Esq.; Armstrong Teasdale LLP

(57) ABSTRACT

A removable cover for a an electrical component box includes a pair of side walls having hinge edges including a hook and an engagement surface extending from the hook. The hook slides over and engages the hinge members of a box, and the engagement surface forms a sliding surface that allows rotation of the cover about the hinge elements. The hinge is easily installed and removed by orienting the cover at a selected angle relative to a longitudinal axis of the box, and lifting the hook over the hinge member to either engage or disengage the hook from the hinge members.

18 Claims, 3 Drawing Sheets

ELECTRIC COMPONENT BOX WITH REMOVABLE COVER

BACKGROUND OF THE INVENTION

This invention relates generally to housing constructions for electric witches and components, and more particularly, to a lock box housing for air conditioning disconnect switches.

One type of known box housing for disconnect switches typically used in air conditioning systems includes a cover or door that pivotally opens upon hinge elements formed into upper side walls of the box. The cover rotates upwardly about the hinge elements, and may be retained in an open position by inserting a leading edge of the cover into slots formed into the side walls of the box. The cover is selectively positionable between the open position allowing access to an interior of the box, and a closed position that protects the contents of the box from the elements. To prevent unauthorized access to the box, a lock opening formed in a bottom end of the box protrudes through a slot in a lower end of the cover, and a lock mechanism such as a padlock, is inserted through the lock opening to prevent opening of the box.

Conventional covers for this type of box include an oblong closed slot in upper ends of each side wall of the cover. The box and cover are assembled so that the slots formed into the cover side walls contain the box hinge elements. As the cover is rotated about the box hinge elements, the relative position of the hinge elements in the closed slot is changed. The slots accommodate the hinge elements as the cover is moved between the open and closed positions. This assembly, however, is not amenable to removal of the cover from the box.

It has been observed in the field that workers sometimes pry or bend the cover side walls and the box side walls apart to free the closed cover slots from the box hinge elements. The cover may then be removed from the box for maximum access to the box interior to complete installation, wiring, and service repair of the contents of the box. Removal of the cover in this fashion is problematic.

Accordingly, it would be desirable to provide a cover for a pull out switch box that may be easily removed and reinstalled in the field.

BRIEF SUMMARY OF THE INVENTION

In an exemplary embodiment of the invention a removable cover for an electrical component box includes a pair of side walls having hinge edges for removable engagement with hinge members formed into the side walls of the box. Specifically, the hinge edges include a first portion forming a hook and a second portion adjacent the first portion and extending substantially parallel to a flat front face of the cover. The hook slides over and engages the hinge members of the box, and the second portion of the hinge edge forms a sliding engagement surface that allows rotation of the cover about the hinge elements.

The hinge is easily installed and removed by orienting the cover at a selected angle relative to a longitudinal axis of the box, and then lifting the hook over a the hinge member to either engage or disengage the hook from the hinge member. At angles substantially different from the selected angle, the cover remains attached to the hook and/or second portion of the cover hinge edges. A lock slot in a lower end of the cover slips over a lock bracket formed in a lower end of the box, and the box may be locked in a closed position by inserting a lock member, such as a padlock, through a lock opening in the lock bracket.

The cover may be retained in the open position by inserting the leading edge of the cover into slots in the box side walls, thereby allowing access to the box while the cover is attached to the box. When maximum access is desired, however, the cover may be completely removed from the box without damaging bending or prying of the box and cover, and the cover may be reattached in its original shape and position, thereby maintaining the integrity and appearance of the box

DETAILED DESCRIPTION OF THE INVENTION

Figure 1:
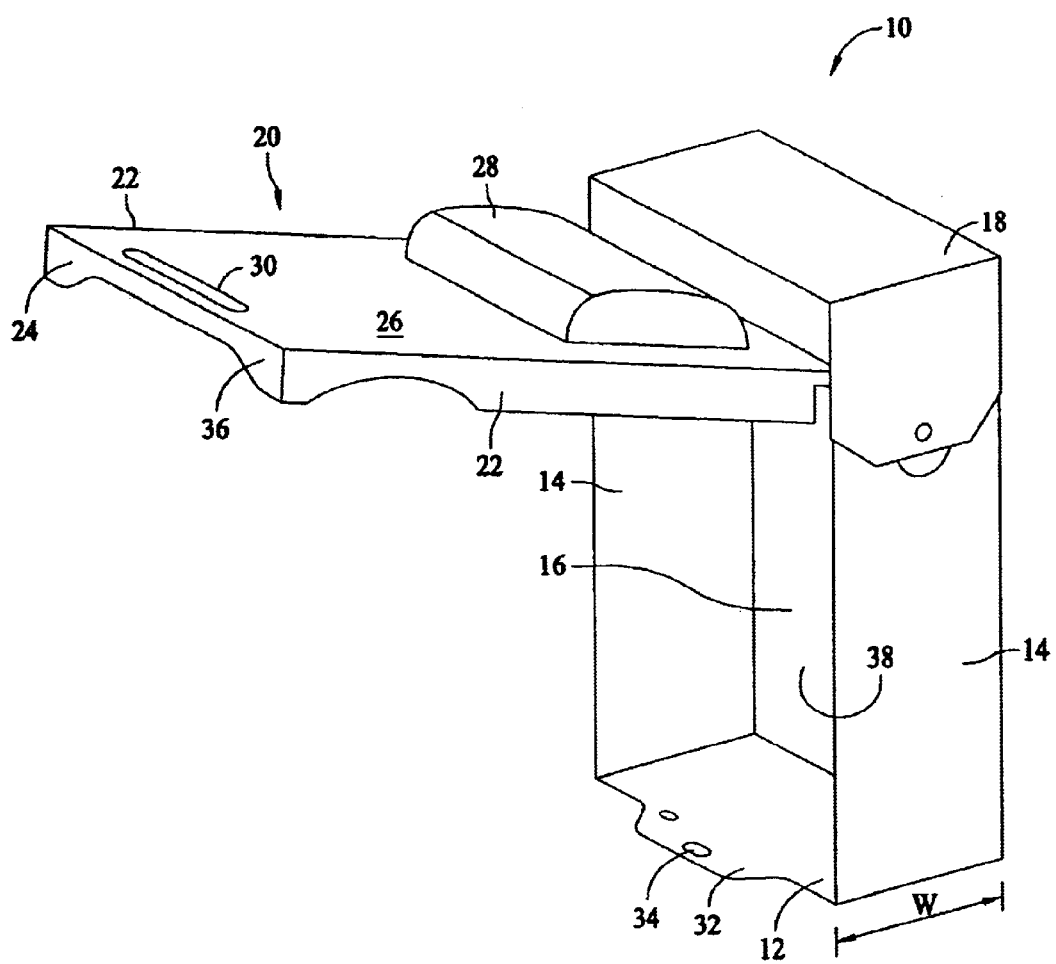
FIG. 1 is perspective view of a lock box including a removable cover in an open position.

FIG. 1 is perspective view of a lock box 10 for electrical components (not shown). While the embodiment of the invention described herein relates to use in a secure housing for a disconnect switch (not shown), such as those used in air conditioning systems, it is contemplated that the benefits of the invention extend well beyond this particular application. More specifically, it is contemplated that the instant invention may be used in conjunction with a large variety of pull out switches, and even more generally in conjunction with a large variety of panel boards. Therefore, the invention is not intended to be restricted to the specific application of housing air conditioning disconnect switches.

Box 10 includes a bottom wall 12, opposite side walls 14 extending from bottom wall 12, a rear wall 16 extending between box side walls 14, and a top section 18 attached to box side walls 14 and to said rear wall 16. Rear wall 16 includes mounting openings (not shown) for mounting of the box and/or electrical components (not shown) therein. A removable cover 20 is attached to box side walls 14 in a manner described firer below. Cover 20 includes opposite side walls 22, a lock end 24, and a front fare 26 including a hollow shroud 28 upwardly depending therefrom for housing a disconnect switch (not shown) or other electrical component (not shown) having a lateral dimension larger than a width W of box side walls 14. Cover lock end 24 includes a slot 30 that fits over a lock bracket 32 integrally formed into box bottom wall 12. A lock opening 34 in lock bracket 32 is dimensioned to accept a lock member or lock mechanism (not shown), such as a padlock to prevent unauthorized access to a box interior 38.

Cover 20 is movable between an open position (shown in FIG. 1) and a closed position (not shown). In the open position, a leading edge (not shown in FIG. 1) of cover 20 is received in slots (not shown In FIG. 1) formed in box side walls 14 to maintain cover 20 at a slight upward angle relative to box 10. In the closed position, cover side walls 22 overlap box side walks 14, and a bottom lip 36 of cover 20 overlaps box bottom wall 12 to seal box interior 38. Cover 20 rotates upon hinge members (not shown in FIG. 1) between the open and closed positions, and cover 20 is removable from the hinge members as desired by a user.

Figure 2:
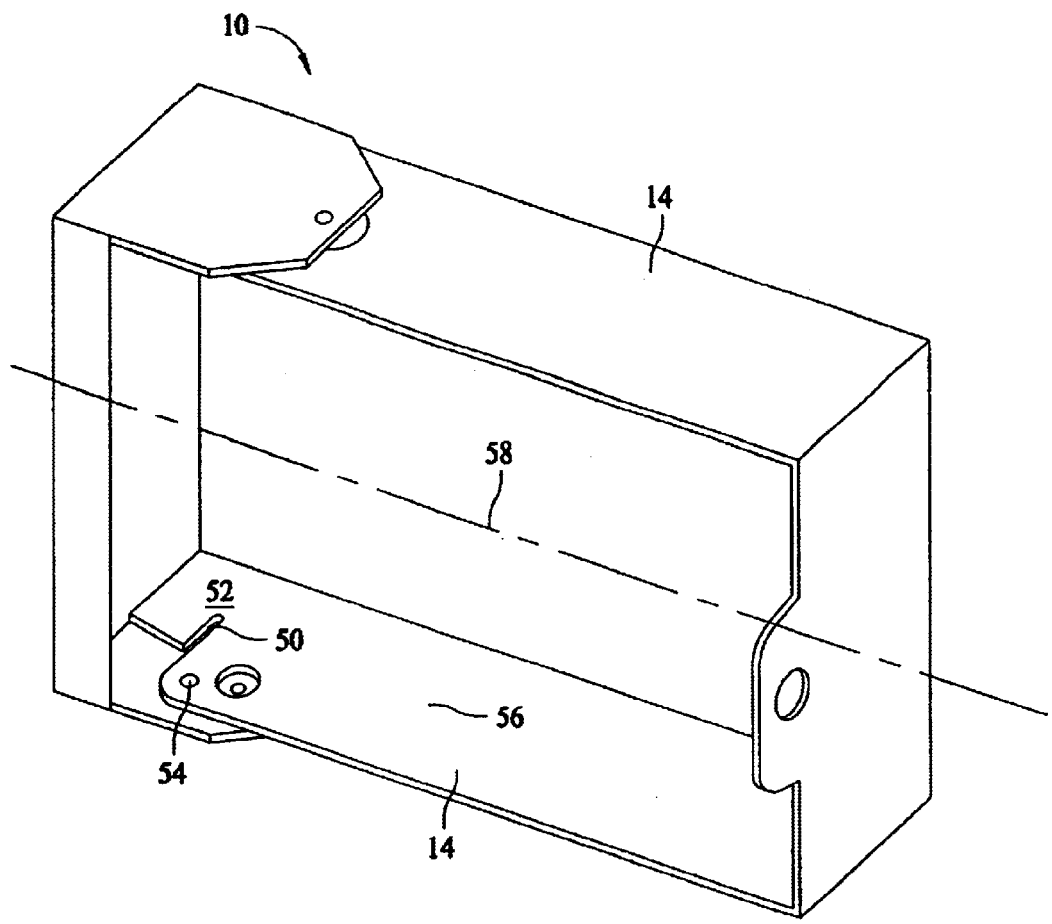
FIG. 2 is a perspective view of the box shown in FIG. 1 with the cover removed.

FIG. 2 is a perspective view of box 10 illustrating a slot 50 formed in an upper end 52 of each box side wall 14 to receive a leading edge (not shown in FIG. 2) of removable cover 20 (shown in FIG. 1) and maintain cover 20 in the open position. A hinge member 54 is located adjacent each slot 50 for engagement with a hinge end (not shown in FIG. 2) of removable cover 20. In a particular embodiment, hinge member 54 is an extruded post or knob projecting from an inner surface 56 of box side walls 14. Box 10 is symmetrical about a longitudinal axis 58, and each of box side walls 14 is a mirror-image of the other.

Figure 3:
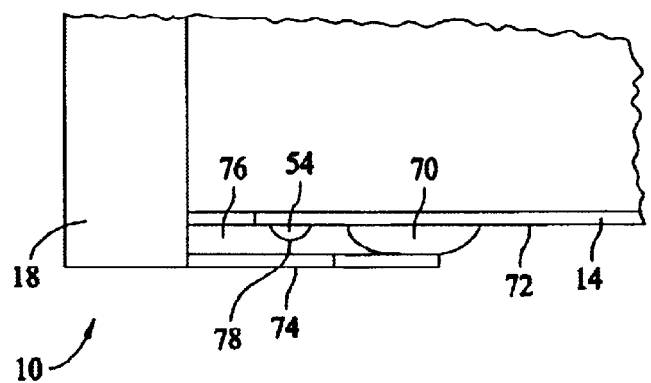
FIG. 3 is a partial plan view of a portion of the box shown in FIG. 2.

FIG. 3 is an enlarged plan view of a top corner of box 10 illustrating a connection of box side wall 14 with top section 18. A rounded protrusion 70 projects from an outer surface 72 of box side wall 14 and is attached to a side wall 74 of top section 18 with a know connector (not shown), such as, for example a rivet. Protrusion 70 spaces top section side wall 74 from box side wall 14 to form a gap 76 therebetween that receives a hinge end (not shown in FIG. 3) of removable cover 20 (shown in FIG. 1). Hinge member 54 also projects from box side wall outer surface 72 into gap 76, but does not contact top section side wall 74. In one embodiment, hinge member 54 includes a rounded surface 78 to facilitate sliding of the hinge end of removable cover 20 upon hinge member 54.

Figure 4:
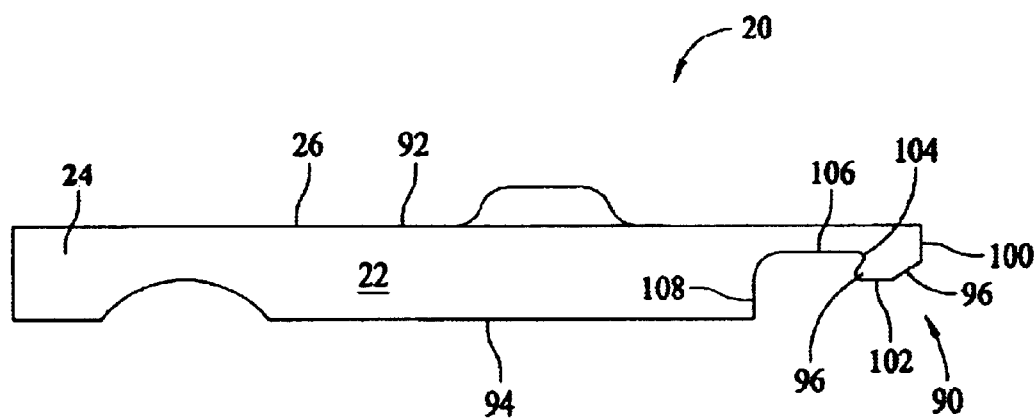
FIG. 4 is a side elevational view of the cover shown in FIG. 1.

FIG. 4 is a side elevational view of removable cover 20 illustrating hinge end 90 opposite lock end 24 on cover side wall 22. Cover side wall 22 is defined by an inner edge 92 extending substantially perpendicular from cover front face 26 and toward an outer edge 94. Hinge end 90 includes a hook 96 that is positioned approximately halfway between inner edge 92 and outer edge 94. Hook 96 includes a chambered edge 98 adjacent a leading edge 100 of removable cover 20, a substantially flat edge 102 adjacent chambered edge 98, and a rounded portion 104 for engaging box hinge member 54 (shown in FIGS. 2 and 3). A substantially flat or straight engagement surface 106 extends rearwardly from hook rounded portion 104 to a stop surface 108 extending substantially perpendicularly to engagement surface 106 and cover outer edge 94. In use, hinge member 54 is engaged to cover engagement surface 106 and cover 20 slides upon hinge member 54 between hook rounded portion 104 and stop surface 108 to place cover 20 in the closed and open position, respectively.

Hook 96 is located between cover inner edge 92 and outer edge 94 to facilitate insertion and removal of hook 96 into gap 76 (shown in FIG. 3) and over box hinge member 54 (shown in FIG. 3). In one embodiment, hook 96 is located approximately equidistant between inner edge 92 and outer edge 94 so that cover 20 may be removed from box 10 (shown in FIG. 2) when cover 20 is oriented at an angle of about 55° with respect to box longitudinal axis 58 (shown in FIG. 2). At angles substantially different from about 55°, cover 20 remains engaged to hook 96 and/or engagement surface 106 adjacent hook 96 of each hinge edge 90. In alternative embodiments, other shapes and locations of hooks are used that require greater or lesser than about a 55° angle of inclination with respect to box longitudinal axis 58 for installation and removal of cover 20 to and from box 10.

Figure 5:
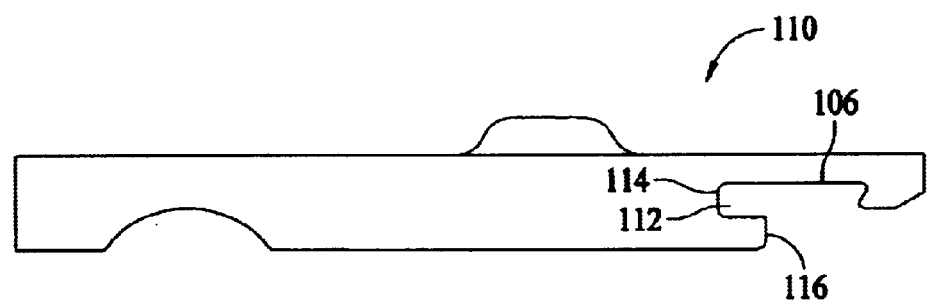
FIG. 5 is a side elevational view of a second embodiment of a removable cover for the box shown in FIGS. 1–3.

FIG. 5 is a side elevational view of a second embodiment of a removable cover 110 similar to cover 20 shown in FIGS. 1 and 4 but including a rounded notch 112 forming a stop surface 114 for hinge members 54 (shown in FIGS. 2 and 3).

Notch 112 is defined by an end surface 116 extending substantially perpendicular to engagement surface 106.

Either cover 20 or cover 110 may be removed from box 10 quickly and easily without damaging box 10 and without impairing the open and closed positions of the cover with respect to box 10. Therefore, the aesthetic appeal of box 10 is maintained and the security of box 10 is unaltered after removal of the cover.

While the invention has been described in terms of various specific embodiments, those skilled in the art will recognize that the invention can be practiced with modification within the spirit and scope of the claims.

What is claimed is:

1. A removable cover for a secure electrical component housing box, the box including opposite side walls, each side wall including a hinge member formed therein, said cover comprising:

a pair of side walls, each comprising a hinge edge configured for removable engagement with the hinge members when the hinge edges are lifted over the hinge members without prying said side walls of said cover or the side walls of the box.

2. A removable cover in accordance with claim 1 wherein said hinge edge comprises a hook.

3. A removable cover in accordance with claim 2 further comprising a substantially flat face extending substantially perpendicularly to said side walls, and said hinge edge comprising an engagement surface extending parallel to said face and adjacent said hook.

4. A removable cover in accordance with claim 3 wherein said hinge edge further comprises a stop surface extending substantially perpendicular to said engagement surface.

5. A removable cover in accordance with claim 4 further comprising a notch extending from said engagement surface and forming said stop surface.

6. A removable cover in accordance with claim 2 wherein each of said side walls comprise an inner edge and an outer edge, said hook located between said inner edge and said outer edge.

7. A removable cover for a secure electrical component housing box, the box including a longitudinal axis and opposite hinge members, said cover comprising:

a hinge end;

a lock end opposite the hinge end; and opposite side walls extending from said hinge end to said lock end, said side walls configured for sliding engagement with the hinge members and further configured for detachment from the hinge members by lifting the cover without bending said side walls of said cover when said cover is oriented at a predetermined angle with respect to the box longitudinal axis.

8. A removable cover in accordance with claim 7 wherein said angle is about 55°.

9. A removable cover in accordance with claim 8 wherein said side walls each comprise a hook.

10. A removable cover in accordance with claim 9 wherein each of said side walls comprise a notch extending from said hook.

11. A removable cover in accordance with claim 9 wherein each of said side walls comprise an inner edge and an outer edge, said hook located between said inner edge and said outer edge.

12. A lock box assembly for an electrical component, said lock box assembly comprising:

a box comprising a longitudinal axis and first and second side walls, each of said first and second side walls comprising a hinge member, a top attached to said side walls, said hinge members separated from said top; and a removable cover configured for sliding engagement with said hinge members and further configured for lifting detachment from said hinge members without tools when said cover is oriented at a selected angle with respect to the box longitudinal axis, wherein said box side walls each comprise a slot for retaining said cover in an open position.

13. A lock box assembly in accordance with claim 12 wherein said cover comprises opposite side walls, each of said cover side walls comprising a hook.

14. A lock box assembly in accordance with in accordance with claim 13 wherein each of said cover side walls comprise a notch extending from said hook.

15. A lock box assembly in accordance with in accordance with claim 13 wherein each of said cover side walls comprise an inner edge and an outer edge, said hook located between said inner edge and said outer edge.

16. A lock box assembly in accordance with claim 15 wherein said selected angle is about 55°.

17. A lock box assembly in accordance with claim 12 wherein said hinge members comprise extruded posts.

18. A lock box assembly in accordance with claim 12 wherein said cover further comprises a lock slot, said box further comprises a lock bracket having an opening therein, said lock bracket protruding through said lock slot when said cover is in a closed position.

* * * * *